(12) United States Patent
Myo (10) Patent No.: US 10,903,616 B2
(45) Date of Patent: Jan. 26, 2021

(54) LASER PROCESSING MACHINE

(71) Applicants: MAANSHAN CITY MINGZHU ELECTRONIC TECHNOLOGY COMPANY LIMITED, Maanshan (CN); OH-LASER CO., LTD, Saitama (JP)

(72) Inventor: Itsuho Myo, Saitama (JP)

( * ) Notice: Subject to any disclaimer, the term of this patent is extended or adjusted under 35 U.S.C. 154(b) by 0 days.

(21) Appl. No.: 16/494,783

(22) PCT Filed: Mar. 30, 2018

(86) PCT No.: PCT/JP2018/013953
§ 371 (c)(1),
(2) Date: Sep. 17, 2019

(87) PCT Pub. No.: WO2019/111428
PCT Pub. Date: Jun. 13, 2019

(65) Prior Publication Data
US 2020/0099189 A1 Mar. 26, 2020

(30) Foreign Application Priority Data

Dec. 5, 2017 (JP) ................................. 2017-233147

(51) Int. Cl.
*H01S 3/04* (2006.01)
(52) U.S. Cl.
CPC .......... *H01S 3/0404* (2013.01); *H01S 3/0405* (2013.01)

(58) Field of Classification Search
CPC ........ H01S 3/04; H01S 3/0404; H01S 3/0405; H01S 3/0407
See application file for complete search history.

(56) References Cited

U.S. PATENT DOCUMENTS 5,608,748 A 3/1997 Reimer et al.
10,651,621 B2 * 5/2020 Nishio .................. H01S 3/1312

FOREIGN PATENT DOCUMENTS

| JP | H0270469 A | 3/1990 |
| JP | 7-60474 A | 3/1995 |
| JP | 9-122946 A | 5/1997 |
| JP | 9-186379 A | 7/1997 |
| JP | 2009-224487 A | 10/2009 |
| JP | 2012-222242 A | 11/2012 |
| WO | WO 2016/084825 Y | 6/2016 |

* cited by examiner

*Primary Examiner* — Armando Rodriguez (57) ABSTRACT

Provided is a laser processing machine having a Peltier refrigeration element for cooling a cooling medium of a laser oscillator in a body of a small household laser processing machine. A laser processing machine 1 includes a device body 10, a laser oscillator 71 received in the device body 10, a cooling medium flow path provided in the device body 10 for allowing a cooling medium of the laser oscillator 71 to flow, and a cooling device 45 provided with a Peltier refrigeration element for refrigerating the cooling medium flowing in the cooling flow path. A cooling fin 621 for discharging heat generated by the Peltier refrigeration element is connected to the cooling device 45. The cooling fin 621 is installed directly upstream of an airflow direction of an air outlet 121 for discharging air in the device body 10 out of the device body 10.

6 Claims, 8 Drawing Sheets

LASER PROCESSING MACHINE

CROSS REFERENCE TO RELATED APPLICATION

This application is a national stage application of International application number PCT/JP2018/013953, filed Mar. 30, 2018, titled "LASER PROCESSING MACHINE," which claims the priority benefit of Japanese Patent Application No. 2017-233147, filed on Dec. 5, 2017, which is hereby incorporated by reference in its entirety.

BACKGROUND

Technical Field

The present invention relates to a small household laser processing machine.

Related Art

Laser processing machines that cut sheet metal by laser irradiation have been widely known. When processing by laser irradiation, the temperature of a laser oscillator rises. Therefore, a gas may be used as a cooling medium for cooling the laser oscillator and cooling a gaseous medium through a Peltier refrigeration element. (Refer to Patent Document 1)

PRIOR ART LITERATURE

Patent Literature

[Patent Document 1] JP-A-2013-247122

SUMMARY

1. Problem to be Solved

As described above, when a cooling medium of a Peltier refrigeration element is used, the Peltier refrigeration element itself releases heat. Therefore, it is not practical to install the Peltier refrigeration element inside a small household laser processing machine to cool a cooling medium of a laser oscillator.

2. Technical Solution

The present invention is directed to providing a laser processing machine having a Peltier refrigeration element for cooling a cooling medium of a laser oscillator in a body of a small household laser processing machine.

The laser processing machine consists of a device body, a laser oscillator received in the device body, a cooling flow path provided in the device body for allowing a cooling medium of the laser oscillator to flow, and a cooling device provided with a Peltier refrigeration element for cooling the cooling medium flowing in the cooling flow path. The cooling device is connected to a cooling fin for dissipating heat generated by the Peltier refrigeration element. The cooling fin is installed upstream of an airflow at an air outlet for discharging air in the device body out of the device body.

Here, it is preferable that a filter is installed in an airflow upstream direction at the airflow of the cooling fin.

In addition, it is preferable that the device body is provided with a storage portion for the cooling medium.

Moreover, it is preferable that the device body is in the shape of a rectangular parallelepiped, and consists of the laser oscillator, the cooling flow path, the cooling device, the cooling fin, and the storage portion provided on a rear wall of the device body where the air outlet is located.

3. Beneficial Effect

Compared with the prior art, the beneficial effects of the present invention are:

(1) The present invention may provide a laser processing machine having a Peltier refrigeration element system for cooling a cooling medium of a laser oscillator inside a small household laser processing machine device.

In which:
1: Laser processing machine;
10: Device body;
12: Rear wall;
42, 42A: Cooling water storage tank;
43, 43A: Temperature control main board;
45, 45A: Cooling device;
60, 60A: Heat dissipation unit;
63: Filter;
71: Laser oscillator;
121: Air outlet;
420: Cooling medium flow path;
452: Peltier refrigeration element;
621: Cooling fin (heat sink).

DETAILED DESCRIPTION

The first embodiment of the present invention will be described below with reference to the drawings.

A laser processing machine 1 is a small household laser processing machine capable of performing laser processing on various materials such as paper and acrylic using a carbon dioxide laser. The laser processing machine 1 is equipped with a device body 10, a laser oscillator 71, a cooling medium flow path 420, and a cooling device 45. In the following description, a direction of the device body 10 from a rear wall 12 to a front wall 11 is defined as front, an opposite direction is defined as rear, and the two directions are defined as a front-rear direction. In addition, in FIG. 1, a direction from a second side wall 16 to a first side wall 15 is defined as left, an opposite direction is defined as right, and the two directions are defined as a left-right direction. In addition, in FIG. 1, a direction from a lower wall 14 to an upper wall 13 is defined as up, an opposite direction is defined as down, and the two directions are defined as an up-down direction.

Embodiment

Figure 1:
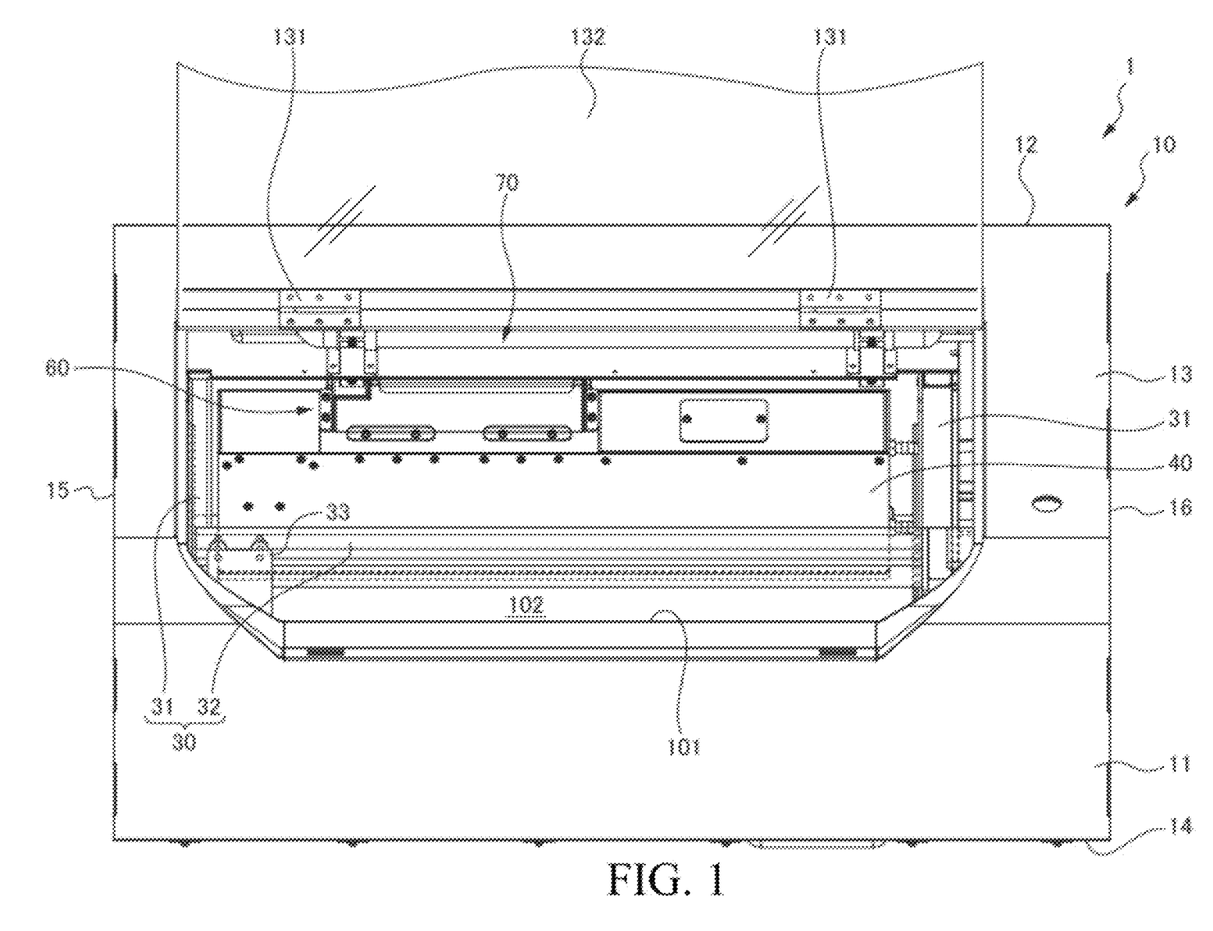
FIG. 1 is a front oblique view of a laser processing machine according to a first embodiment of the present invention.

The device body 10 in the shape of a rectangular parallelepiped and includes, as shown in FIG. 1, a front wall 11, a rear wall 12, an upper wall 13, a lower wall 14, a first side wall 15, and a second side wall 16. The rear wall 12, the upper wall 13, the lower wall 14, the first side wall 15 and the second side wall 16 are made of sheet metal such as an aluminum alloy which has been subjected to surface painting.

The first side wall 15 and the second side wall 16 face each other, and the upper wall 13 and the lower wall 14 face each other. Lower ends of the front wall 11, the rear wall 12, the first side wall 15 and the second side wall 16 are all connected to the lower wall 14. A body opening portion 101 is formed between a front portion of the upper wall 13 and an upper portion of the front wall 11. A rear portion of the upper wall 13 is connected by a pair of hinges 131 to support the rotation of an upper cover 132 relative to the upper wall 13. The upper cover 132 has substantially the same shape as the body opening portion, and the body opening portion can be opened and closed.

Figure 2:
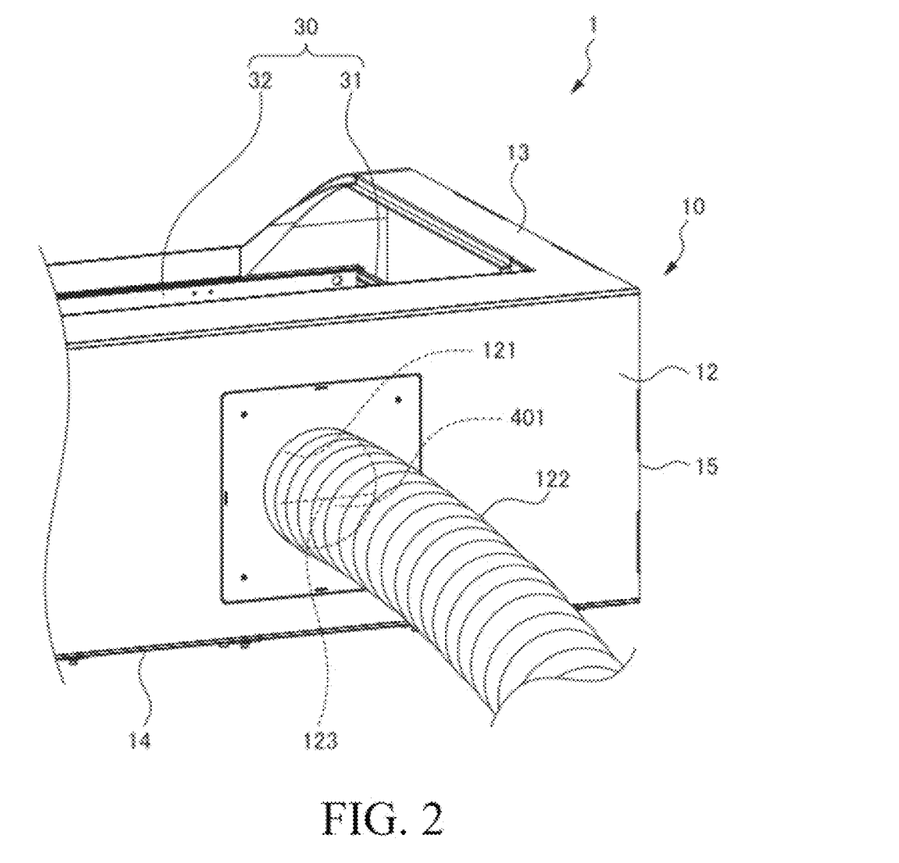
FIG. 2 is a rear oblique view of a laser processing machine according to a first embodiment of the present invention.

Inner sides of the front wall 11, the rear wall 12, the upper wall 13, the upper cover 132, the lower wall 14, the first side wall 15 and the second side wall 16 form a processing space 102 surrounded by the wall surfaces in the device body 10. A laser processing object may be placed in the processing space 102 for laser processing. An air outlet 121 is formed on the rear wall 12 as shown in FIG. 2. The air outlet 121 is formed by a circular through hole penetrating the rear wall 12, has a diameter of about 10 cm, and is formed at a left position relative to a center point of the rear wall 12. An outer side of the rear wall 12 having the air outlet 121 is connected to one end of a hose 122. The other end of the hose 122 is connected to a fan (not shown), where the fan is activated during laser processing irradiation, and air in the processing space 102 is taken out and discharged to the outside of the processing space 102.

A baffle 123 as shown in FIG. 2 and the like is provided at a position facing the through hole in the device body 10. The baffle 123 should be capable of blocking an upper half of the air outlet 121, and the baffle 123 can prevent laser light from leaking out of the device body 10 from the processing space 102 through the aftermentioned cooling fin 621. A lower half of the air outlet 121 faces a back plate 401 of an aftermentioned lower case 40. The back plate 401 of the lower case 40 and the baffle 123 should be kept at a certain distance in the front-rear direction.

A guide rail 30 is provided in the processing space 102. As shown in FIG. 1, the guide rail 30 has guide rails 31 installed on left and right sides of the processing space 102 respectively for the front-rear direction and a pair of guide rails 32, for the left-right direction, mounted on the guide rails 31 for controlling the front-rear direction. The guide rails 32 in the left-right direction are kept parallel to the left-right direction, and are movable back and forth relative to the guide rails 31 in the front-rear direction. The guide rails 32 in the left-right direction are provided with a relative portion 33 of an object processing portion that is movable along the guide rails 32 for controlling the left-right direction. The relative portion 33 of the object processing portion is provided with a mirror, and laser light emitted from the laser oscillator 71 is reflected onto an object workpiece. The guide rails 32 for controlling the left-right direction and the relative portion 33 of the object processing portion may be driven to move by a motor (not shown) in order to irradiate the laser light to a specified position of the object workpiece.

Figure 3:
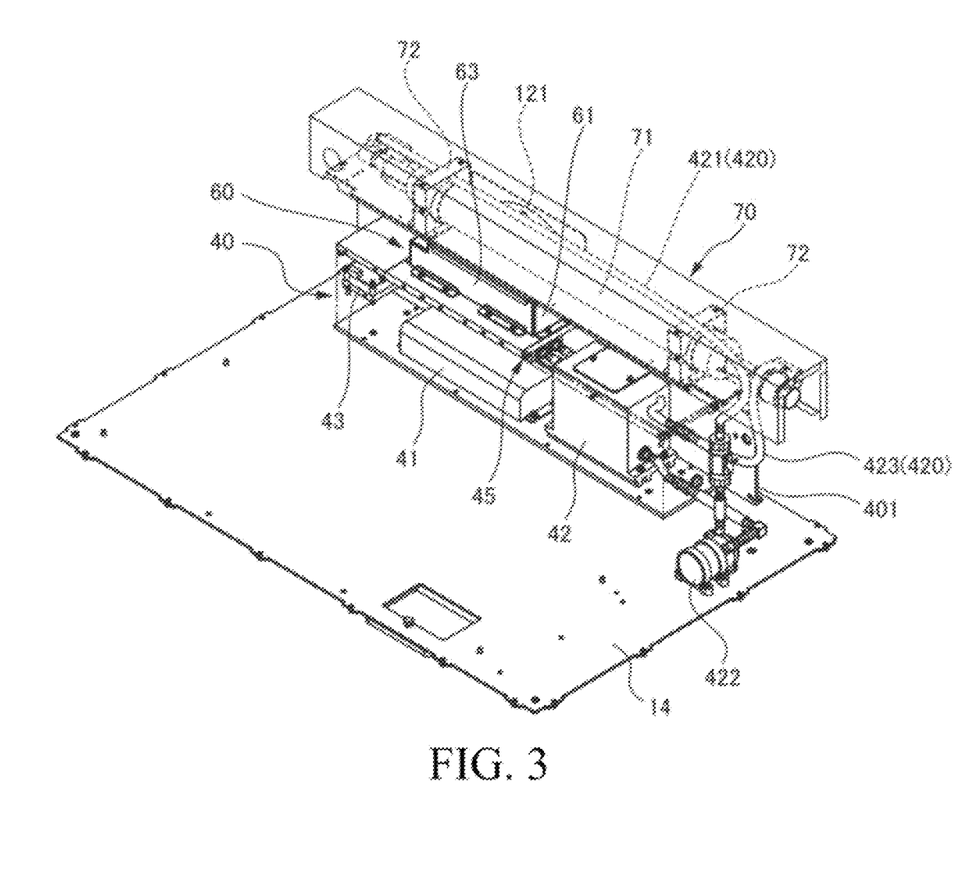
FIG. 3 is a detailed oblique view of a cooling medium flow path of a laser processing machine according to a first embodiment of the present invention.
Figure 4:
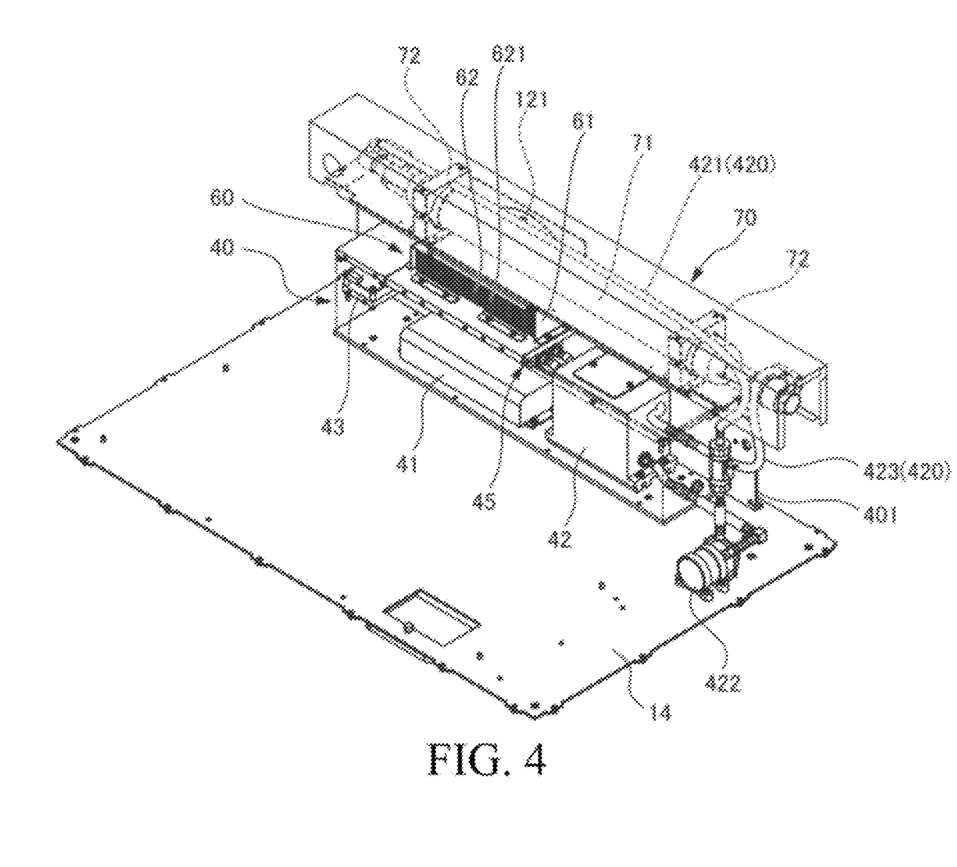
FIG. 4 is a detailed oblique view of a laser processing machine from which a filter is removed according to a first embodiment of the present invention.

As shown in FIG. 3, a metal lower case 40 in the shape of a rectangular parallelepiped, a heat dissipation unit 60 and a laser oscillator case 70 are respectively installed inside the processing space 102, near the rear wall 12, in an upward direction of the lower wall 14.

The laser oscillator 71 is received in the laser oscillator case 70. The laser oscillator 71 is composed of a glass high-voltage excitation laser oscillator that generates a carbon dioxide laser. The laser oscillator 71 is supported by a pair of bases 72 inside a rectangular-parallelepiped metal generator case 70.

The laser oscillator 71 has a cylindrical shape and is composed of three layers of concentric circular glass tubes centered on the axis of the laser oscillator 71. Among the three layers of glass tube space, the space closest to the center portion and the outermost space are filled with gas such as carbon dioxide ($CO_2$), nitrogen ($N_2$), or helium (He). The space therebetween is filled with a cooling liquid composed of a refrigerant liquid or the like, which flows as a cooling medium from the left side of the laser oscillator 71 to the right side to cool the laser oscillator 71.

The lower case 40 is fixed to the lower wall 14. The lower case 40 includes a power unit 41, a cooling water storage tank 42 and a temperature control main board 43. The cooling water storage tank 42 is configured to store a cooling medium, where it is made of acrylic in the shape of a rectangular parallelepiped, is covered with a heat insulating sponge on the entire outer side, and is fixed to the lower wall 14 where the right portion of the lower case 40 is located. However, the material of the cooling water storage tank 42 is not limited to acrylic, as long as it is a water repellent material. A few hundred milliliters (mL) of cooling water such as a cooling liquid is stored in the cooling water storage tank 42. One side of a pipeline part 421 is connected to the cooling water storage tank 42 for supplying temperature-reduced cooling water to the left side of the laser oscillator 71, a water circulation pump 422 with a flow sensor is installed in the middle of the pipeline part 421, and the water circulation pump 422 is installed between the rear wall corresponding to the right side of the processing space 102 (not shown) and the second side wall 16 (inside a side panel).

The other side of the pipeline part 421 is connected to the left side of the laser oscillator 71. The water circulation pump 422 drives the cooling water in the cooling water storage tank 42 to flow into the laser oscillator 71. In addition, one side of a pipeline part 423 is connected to the cooling water storage tank 42, so the cooling water for raising the internal temperature of the laser oscillator 71 flows from the right side of the laser oscillator 71 back to the cooling water storage tank 42, and the other side of the pipeline part 423 is connected to the right side of the laser oscillator 71.

The power unit 41 is in the shape of a rectangular parallelepiped and is fixed to a bottom surface on the left side of the lower case 40. The power unit 41 has a built-in power circuit that increases or decreases an external supply voltage such that the power unit is in a stable state and supplies power to the temperature control main board 43 and the like.

Figure 5:
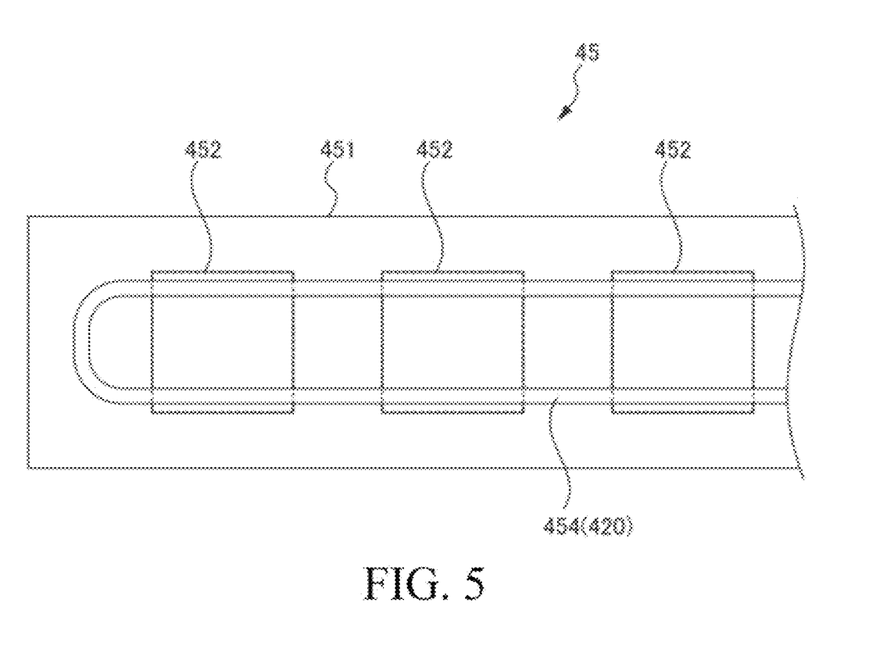
FIG. 5 is a detailed bottom view of a cooling device of a laser processing machine according to a first embodiment of the present invention.
Figure 6:
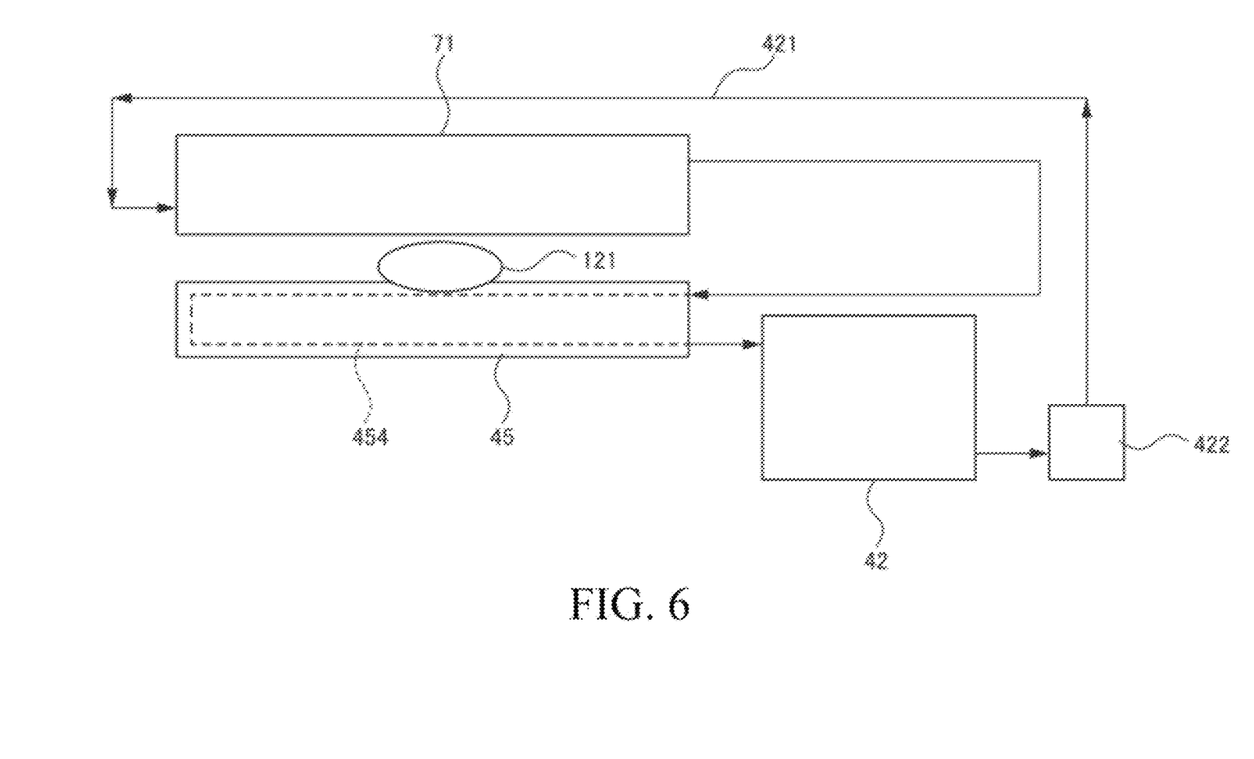
FIG. 6 is a block view of a cooling flow path of a laser processing machine according to a first embodiment of the present invention.

As shown in FIG. 3, a cooling device 45 is provided above the power unit 41 in the lower case 40. As shown in FIG. 5, the cooling device 45 includes a metal cooling case 451 in the shape of a rectangular parallelepiped and Peltier refrigeration elements 452 provided in the cooling case 451. The Peltier refrigeration elements 452 are of three square plate-like structures having a side length of 3 cm and are installed on a straight line.

In addition, a pipeline part 454 for allowing cooling water to flow is provided in the cooling case 451. The pipeline part 454 extends from the right side of the cooling case 451 to the left side of the cooling case 451 relative to the three Peltier refrigeration elements 452 respectively, returns at the left side, and then extends from the left side of the cooling case 451 to the right side of the cooling case 451 relative to the three Peltier refrigeration elements 452 respectively. The two sides of the pipeline part are respectively extended and connected to the cooling water storage tank 42, the temperature-increasing cooling water flows into a position relative to the Peltier refrigeration element 452 through the pipeline part 454 to be cooled, and the cooled cooling water flows back to the cooling water storage tank 42 through the pipeline part 454. The pipeline parts 454, 421 and 423 form the cooling medium flow path 420.

As shown in FIG. 3, etc., a temperature control main board 43 is provided on the upper left portion of the lower case 40. The temperature control main board 43 is fixed to the left upper plate of the lower case 40, and is connected to a temperature sensor (not shown) installed on the cooling device 45 with the Peltier refrigeration element 452. When the temperature sensor (not shown) senses a heat dissipation side of the Peltier refrigeration element 452, that is, the temperature of the upper side of the Peltier refrigeration element 452 exceeds a first predetermined temperature, the temperature control main board 43 may stop a cooling function of the Peltier refrigeration element 452 and stop laser irradiation to prevent the temperature from being too high. In addition, the temperature control main board 43 is connected to a temperature sensor (not shown) installed on the cooling water storage tank 42. When the temperature sensor (not shown) senses that the temperature of cooling water in the upper portion of the cooling water storage tank 42 exceeds a second predetermined temperature, the temperature control main board 43 may start a refrigeration function of the Peltier refrigeration element to cool the cooling water.

The heat dissipation unit 60 is fixed to an upper plate of the lower case 40. The heat dissipation unit 60 includes a plate member 61, a heat sink 62 and a filter 63. The plate member 61 is in the shape of a rectangular parallelepiped formed by bending a metal plate and having an opening in the front-rear direction. A lower end of the plate member 61 is fixed to the upper plate of the lower case 40, and the upper plate of the lower case 40 and the plate member 61 form a receiving space for the heat sink.

In the receiving space for the heat sink, the heat sink 62 is integrally connected and fixed to a plate surface of the lower case 40 to achieve heat conduction. The heat sink 62 is composed of a plurality of metal cooling fins 621 parallel in the front-rear direction and the up-down direction. The cooling fin 621 and the upper plate of the lower case 40 are both made of a metal material, so heat generated by the Peltier refrigeration element 452 may be conducted to the cooling fin 621 through the upper plate of the lower case 40, thereby achieving high thermal conductivity.

The filter 63 is fixed to the front surface of the cooling fin 621 and covers the entire front surface of the cooling fin 621. The filter 63 may prevent debris, dust and the like generated during laser processing from entering space between the cooling fins 621. The rear side of the cooling fin 621 faces the air outlet of the rear wall 12 with the baffle 123 therebetween. According to this configuration, the cooling fins 621 should be installed directly upstream of the airflow direction of the air outlet 121, and the air outlet 121 allows air inside the device body 10 to be discharged out of the device body 10. The filter 63 should be fixed upstream of the airflow direction of the cooling fins 621.

Here, "directly upstream" means a direction directly upstream of the air outlet 121 except for the baffle 123 that is indispensable for preventing laser light in the processing space 102 from leaking out of the device body 10. Therefore, as with this embodiment, in addition to the thin baffle 123, the cooling fin 621 should be located extremely close to the air outlet 121. That is, there are no components other than the baffle 123, and the distance between the cooling fin 621 and the air outlet 121 is very short. Therefore, if the power unit 41 or the temperature control main board 43 or the like is present between the cooling fin 621 and the air outlet 121, the concept of "directly upstream" is not satisfied.

In the laser processing machine 1 having the above configuration, the function of cooling the cooling water by the Peltier refrigeration element 452 will be described below.

When the temperature sensor (not shown) detects that the temperature of the cooling water exceeds the second predetermined temperature, the temperature control main board 43 starts driving the water circulation pump 422, so the cooling water in the cooling water storage tank 42 is supplied to the laser oscillator 71 through the pipeline part 421. The cooling water with the temperature increased after cooling the laser oscillator 71 flows into the pipeline part 454 of the cooling device 45 through the pipeline part 423 which penetrates the cooling water storage tank 42. The cooling water in the pipeline part 454 of the cooling device 45 is cooled by the Peltier refrigeration element 452.

Figure 7:
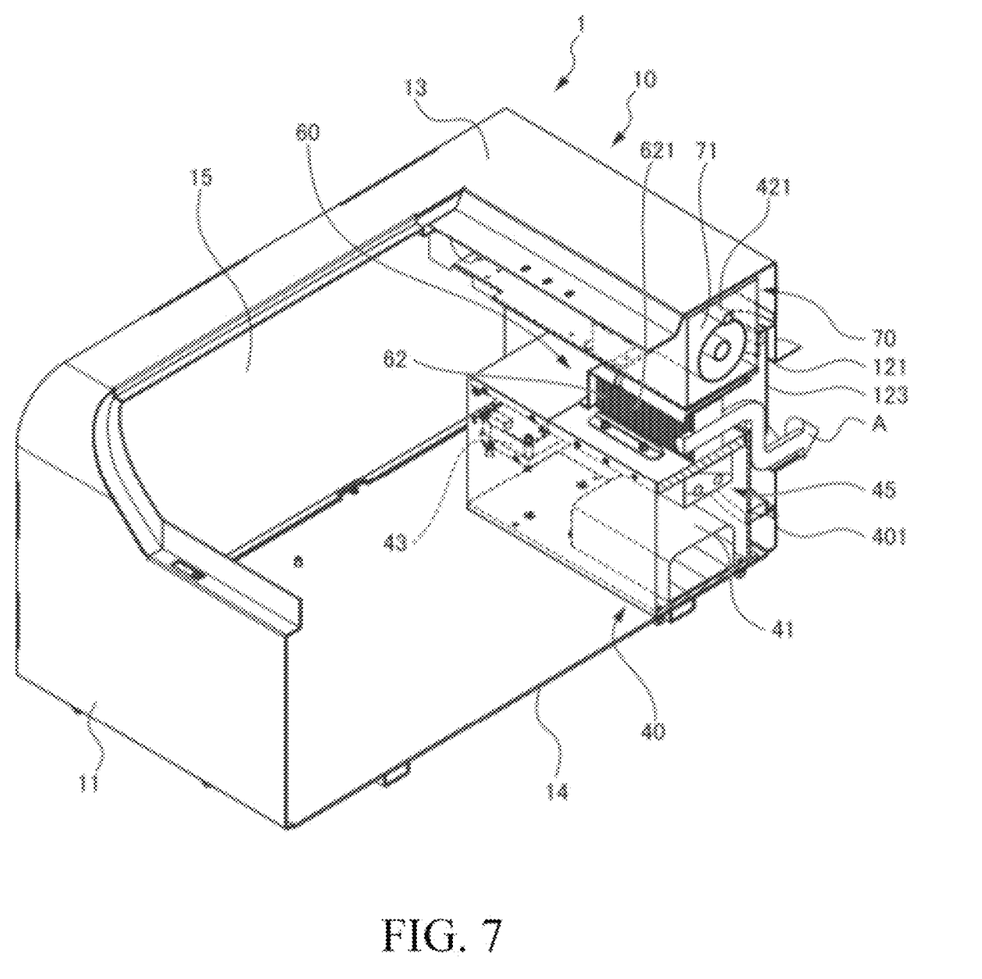
FIG. 7 is a cross-sectional view showing an airflow direction of a cooling fin for cooling a Peltier refrigeration element of a laser processing machine in a first embodiment of the present invention.

At this time, heat is generated on a side opposite to the Peltier refrigeration element 452 (the upper side of the Peltier refrigeration element 452) facing the cooling water pipeline part 454. The generated heat is transmitted to the cooling fin 621 through the plate member 61, transmitted from the cooling fin 621 to air inside the device body 10, which generates an airflow that is discharged out of the device body 10 through the air outlet 121 (the airflow is referred to by a bold arrow A in FIG. 7). Then, the temperature-reduced cooling water flows into the cooling water storage tank 42 from the pipeline part 454 and is stored in the cooling water storage tank 42.

The laser processing machine 1 having the above configuration may exhibit the following effects. As described above, the laser processing machine 1 includes a device body 10, a laser oscillator 71 received in the device body 10, a cooling medium flow path 420 installed inside the device body 10 for allowing a cooling medium of the laser oscillator 71 to flow, and a cooling device 45 provided with a Peltier refrigeration element 452 for cooling the cooling medium in the cooling medium flow path 420.

The cooling device 45 is connected to cooling fin 621 for dissipating heat generated in the Peltier refrigeration element 452. The cooling fin 621 is installed directly upstream of an airflow direction of an air outlet 121. The air outlet 121 is used for discharging air inside the device body 10 out of the device body 10.

According to the above configuration, the air discharged out of the device body 10 from the processing space 102 through the air outlet 121 can be used to discharge the heat of the hot Peltier refrigeration element 452 out of the device body 10. Therefore, the Peltier refrigeration element 452 may be installed inside the device body 10 for reducing the temperature of the cooling water. Therefore, even if the temperature of an environment around the laser processing machine 1 is as high as about 40° C., the temperature of the cooling water can be reduced to about 20° C. for laser processing.

In addition, a filter 63 is fixed upstream of the airflow of the cooling fin 621. The configuration may prevent debris, dust and the like generated by laser irradiation in a processing space 102 from entering space between the cooling fins 621 to cause contamination and clogging. Since the air in the processing space 102 is air contaminated by debris and dust, the air inside the device body 10 can be treated by the filter 63 and then discharged out of the device body 10 through the cooling fin 621.

In addition, a cooling water storage tank 42 is provided inside the device body 10 as a storage portion for storing the cooling medium. With this structure, it is no longer necessary to provide a storage portion for storing the cooling medium outside the device body 10, thereby achieving miniaturization of a driving structure of the laser processing machine 1.

Next, a laser processing machine according to a second embodiment of the present invention will be described. The laser processing machine according to the second embodiment of the present invention is different from the laser processing machine according to the first embodiment in the configuration of a lower case 40A and the configuration of the case 40 in the first embodiment. Except for this, all the configurations are the same as in the first embodiment. Therefore, the same reference numerals will be used, and the description will be omitted.

Figure 8:
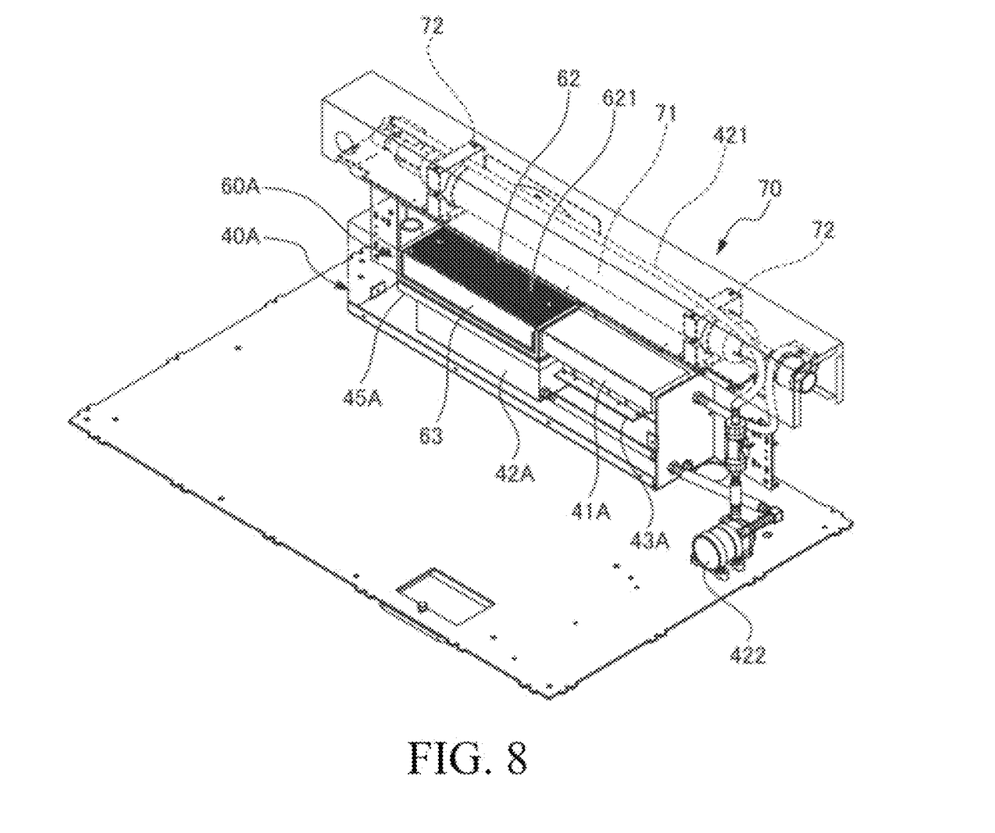
FIG. 8 is a detailed oblique view of a laser processing machine according to a second embodiment of the present invention.

As shown in FIG. 8, the lower case 40A is in the shape of a rectangular parallelepiped and is formed by bending a single piece of metal plate. A groove is provided on the upper left side of a case plate member, and a heat dissipation unit 60A is embedded in the groove. A filter 63 is provided at a front end of the heat dissipation unit 60, and a cooling fin 621 is provided on a rear side.

In the lower case 40A, a cooling water storage tank 42A is installed below the heat radiation unit 60A. In the lower case 40A, a power unit 41A is installed on the right side of the heat dissipation unit 60A. In the lower case 40A, a temperature control main board 43A is installed below the power unit 41A. The cooling device 45 is installed below the heat dissipation unit 60A in the lower case 40A, and fixed to an upper plate of the lower case 40A for heat conduction.

The present invention is not limited to the foregoing embodiments, and various solutions may be included in the scope of the claims. For example, the number, configuration and size of the Peltier refrigeration elements in the cooling device are not limited to the number, configuration and size of the Peltier refrigeration elements 452 described in this embodiment. In addition, the shape, configuration and the like of each portion are not limited to the shape, configuration and the like of each portion described in this solution.

What is claimed is:

1. A laser processing machine, comprising:
   a device body; and
   a laser oscillator received in the device body,
   a cooling medium flow path installed in the device body for allowing a cooling medium of the laser oscillator to flow, and
   a cooling device provided with a Peltier refrigeration element for cooling the cooling medium flowing in the cooling medium flow path,
   wherein a cooling fin for dissipating heat generated by the Peltier refrigeration element are connected to the cooling device, and
   the cooling fin being installed directly upstream of an airflow direction of an air outlet for discharging air in the device body out of the device body.

2. The laser processing machine according to claim 1, wherein a filter is installed upstream of the airflow direction at the cooling fin.

3. The laser processing machine according to claim 1, wherein a storage portion for storing the cooling medium is installed in the device body.

4. The laser processing machine according to claim 3, wherein the device body is in the shape of a rectangular parallelepiped, and
   the laser oscillator, the cooling medium flow path, the cooling device, the cooling fin and the storage portion are installed on a rear wall of the device body with the air outlet.

5. The laser processing machine according to claim 2, wherein a storage portion for storing the cooling medium is installed in the device body.

6. The laser processing machine according to claim 5, wherein the device body is in the shape of a rectangular parallelepiped, and
   the laser oscillator, the cooling medium flow path, the cooling device, the cooling fin and the storage portion are installed on a rear wall of the device body with the air outlet.

* * * * *